Figure 1:
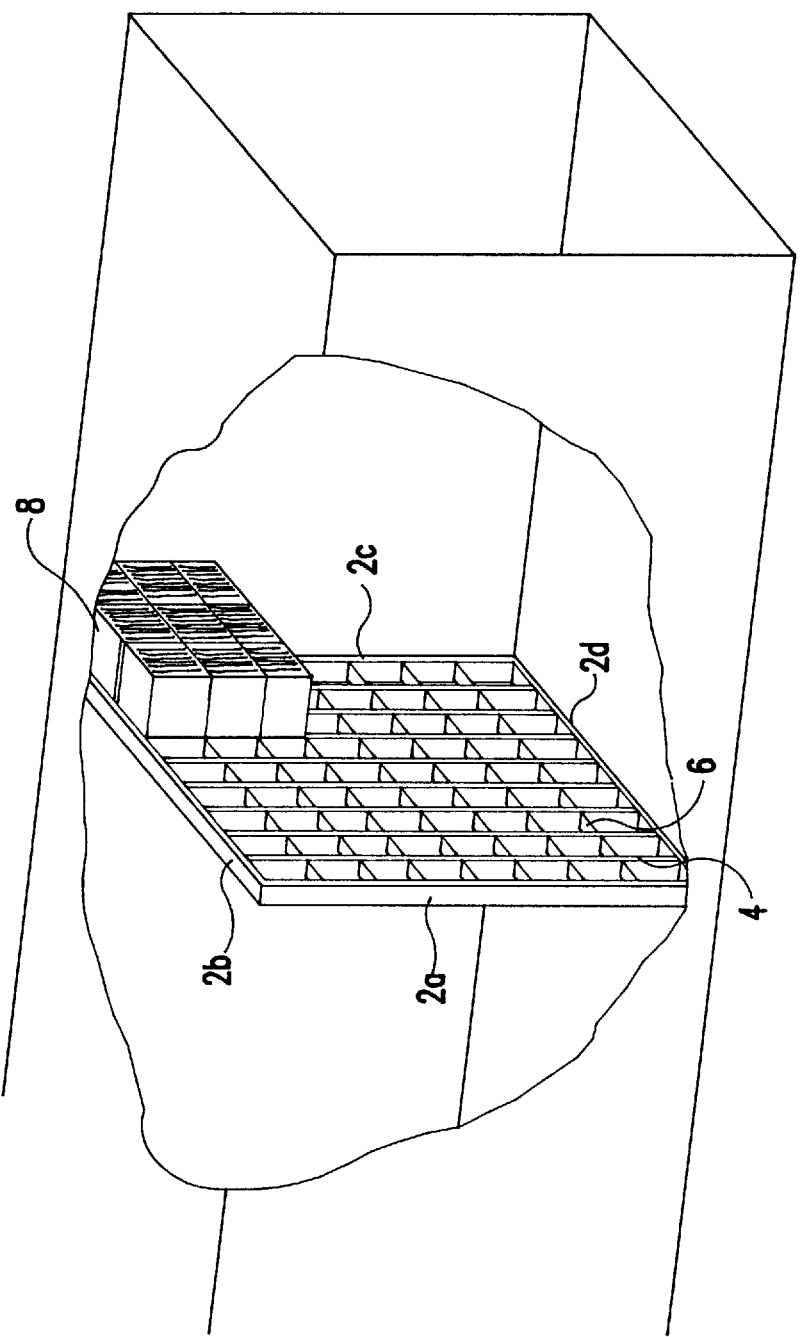

United States Patent
Thomsen et al.

[11] Patent Number: 5,809,645
[45] Date of Patent: Sep. 22, 1998

[54] METHOD FOR IN SITU INSTALLATION OF CATALYST MODULES IN AN OFF-GAS CHANNEL

[75] Inventors: Søren Gyde Thomsen, Lyngby; Henrik Otto Stahl, Rungsted Kyst, both of Denmark

[73] Assignee: Haldor Topsoe A/S, Lyngby, Denmark

[21] Appl. No.: 701,020

[22] Filed: Aug. 21, 1996

Related U.S. Application Data

[60] Provisional application No. 60/003,036, Aug. 30, 1995.
[51] Int. Cl.$^6$ .................................................... B23P 15/00
[52] U.S. Cl. ........................................ 29/890; 29/890.14
[58] Field of Search ............................... 29/890.14, 890, 29/428; 422/168

[56] References Cited

U.S. PATENT DOCUMENTS

| | | |
|---|---|---|
| 1,972,309 | 9/1934 | McMurchy . |
| 4,207,083 | 6/1980 | Gelhaar et al. . |
| 4,265,473 | 5/1981 | Russo . |
| 5,318,755 | 6/1994 | Kuivalainen et al. .................. 422/171 |

FOREIGN PATENT DOCUMENTS

| | | |
|---|---|---|
| 3825958 | 2/1990 | Germany . |

*Primary Examiner*—Irene Cuda
*Attorney, Agent, or Firm*—Ostrolenk, Faber, Gerb & Soffen, LLP

[57] ABSTRACT

A method for the in situ installation of catalyst modules in an off-gas channel includes arranging within the channel perpendicular to gas flow direction a fitting frame by mounting elongated panels on walls of the channel, mounting the frame a number of horizontal and vertical suspension panels with a horizontal and vertical interval corresponding to the horizontal and vertical length of a catalyst module, and suspending, in gas tight manner, the catalyst modules on the suspension panels.

1 Claim, 5 Drawing Sheets

METHOD FOR IN SITU INSTALLATION OF CATALYST MODULES IN AN OFF-GAS CHANNEL

This application claims the benefit of U.S. Provisional Application Ser. No. 60/003,036, filed Aug. 30, 1995.

The invention relates to a method for in situ installation of catalyst modules in an off-gas channel.

At certain types of off-gas cleaning processes, the gas passes through a layer of catalytic material. The gas channels are usually arranged in a way, where the catalyst layer is arranged on a horizontal grid and the gas passes the layer in direction of gravity.

Generally, the catalyst layer is built into a cubical container, which surrounds the catalyst layer with four sides being at right angles to the flow direction and with the remaining two sides being open for flow through the container.

Such steel container, which is called a module, is mainly cubically formed.

Typically, a number of cubically formed modules are built together on a frame, which is placed horizontally on a grate or a grid in the gas channel and wherein the gas vertically flows through the modules.

In certain applications, vertical erected gas channels are inappropriate. It is, therefore, desirable to build a system by which the catalyst material is arranged on non-horizontal supporting means.

It is an object of this invention to provide a method for installing catalyst modules in a gas channel.

Accordingly, the present invention provides a method for in situ installation of catalyst modules in an off-gas channel comprising the steps of arranging within the channel perpendicular to the gas flow direction a fitting frame by mounting elongated panels on walls of the channel;

mounting on the frame a number of horizontal and vertical suspension panels with a horizontal and vertical interval corresponding to the horizontal and vertical length of a catalyst module; and suspending in gas tight manner the catalyst modules on the suspension panels.

On the framework, modules (8) are mounted separately. The framework may e.g. be built up by four strong panels 2a, 2b, 2c, 2d, which form a frame fitting tightly the walls of the channel (see FIG. 1). The framework is divided by columns (4, 6) arranged in the frame at an interval corresponding to the width of a module (8).

Each module is fastened to panels (4, 6) of the framework tightly against the panels at the terminal surfaces of the module side walls and against modules above and beneath on the two remaining surfaces of the module side walls, as shown in FIG. 2–5.

EXAMPLES

The modules may be fastened on the framework on all four terminal surfaces of module side walls, as shown in FIG. 2–5.

Figure 2:
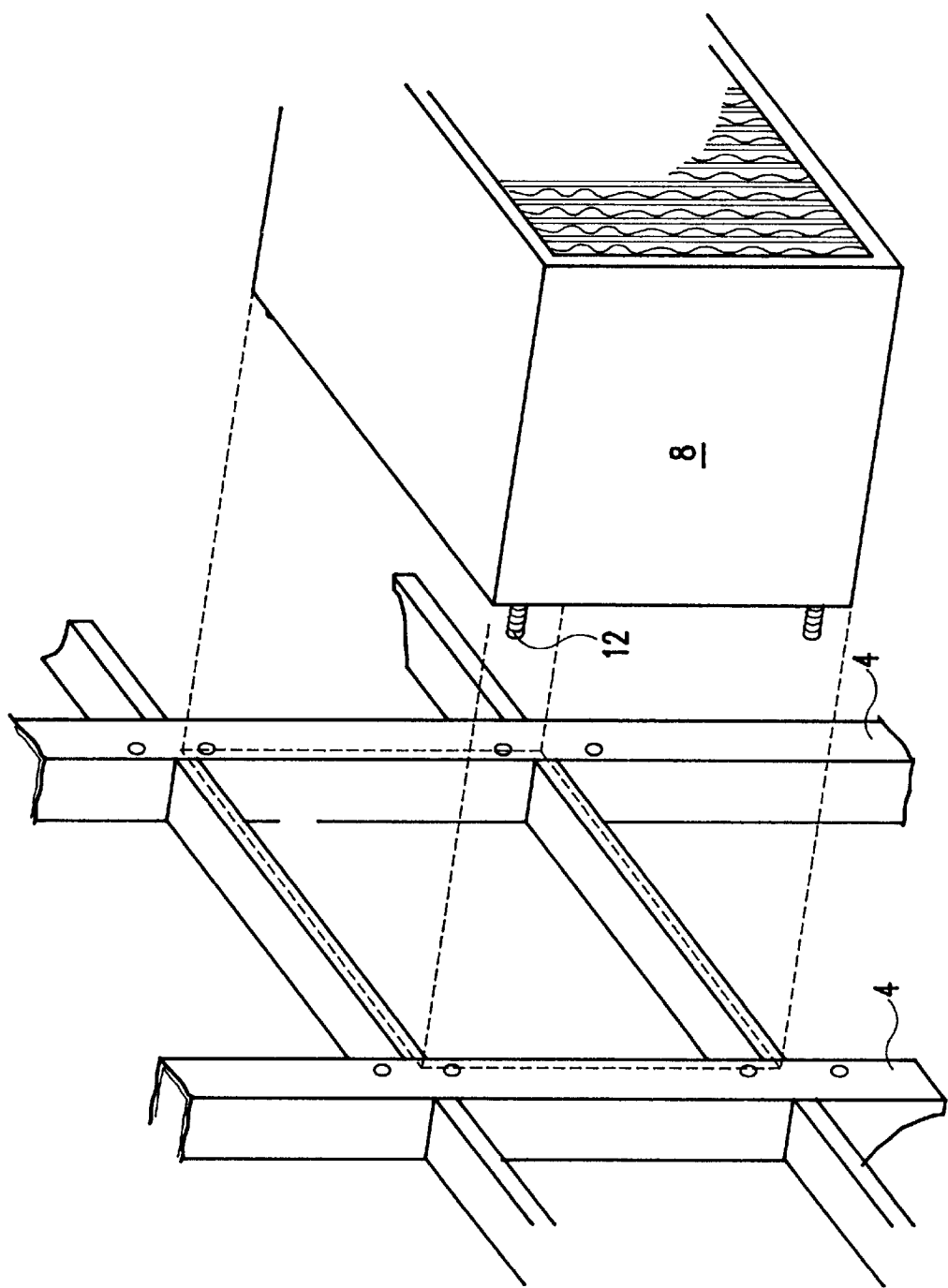
Figure 3:
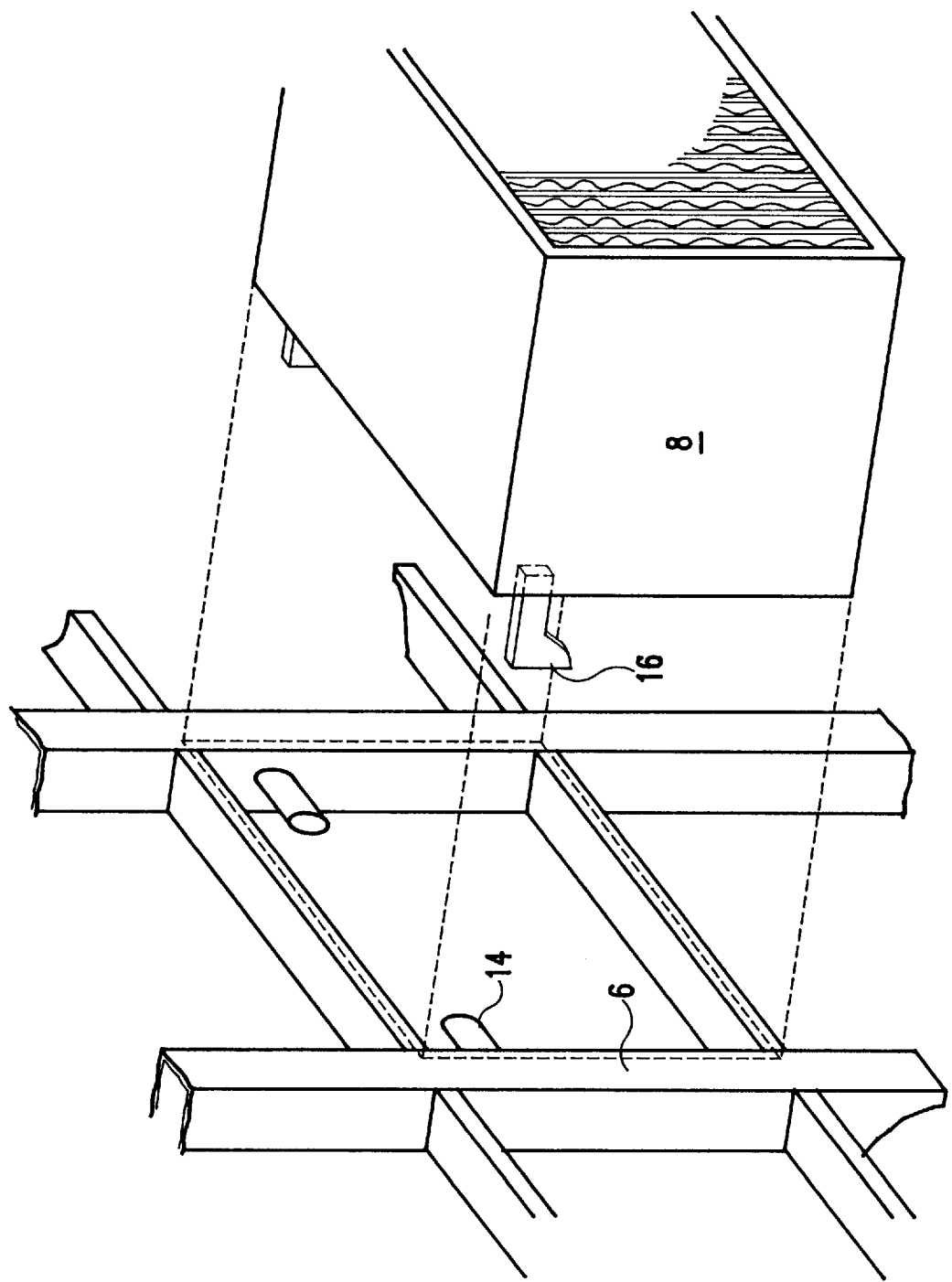

(a) The modules (8) are mounted on panels (4) by means of screw bolts (12), as shown in FIG. 2;

(b) panels (6) are provided with bolts (14) on which the modules are hinged by means of wedge-shaped "ears" (16), which are suspended on bolts (14), as shown in FIG. 3.

Figure 4:
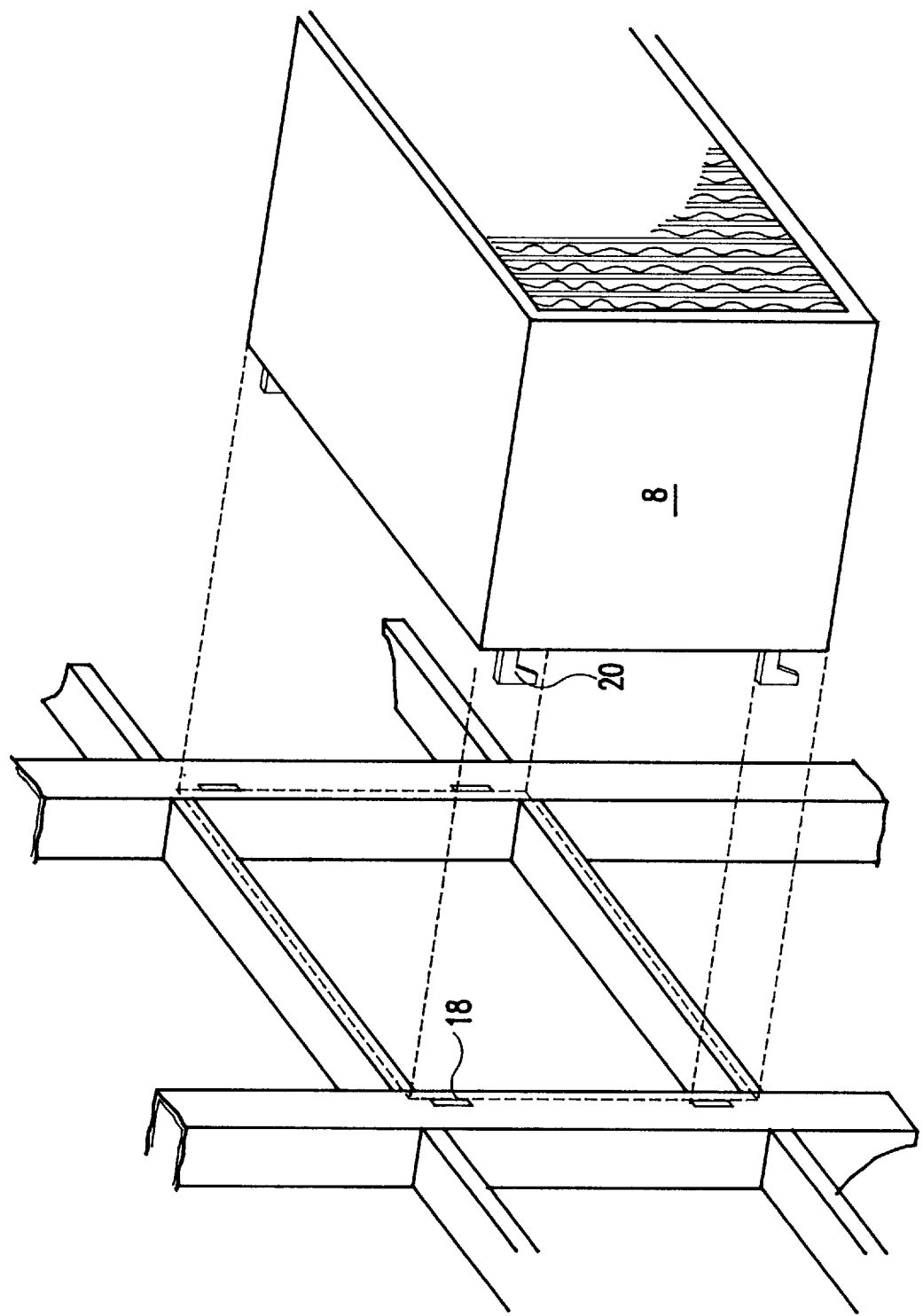
Figure 5B:
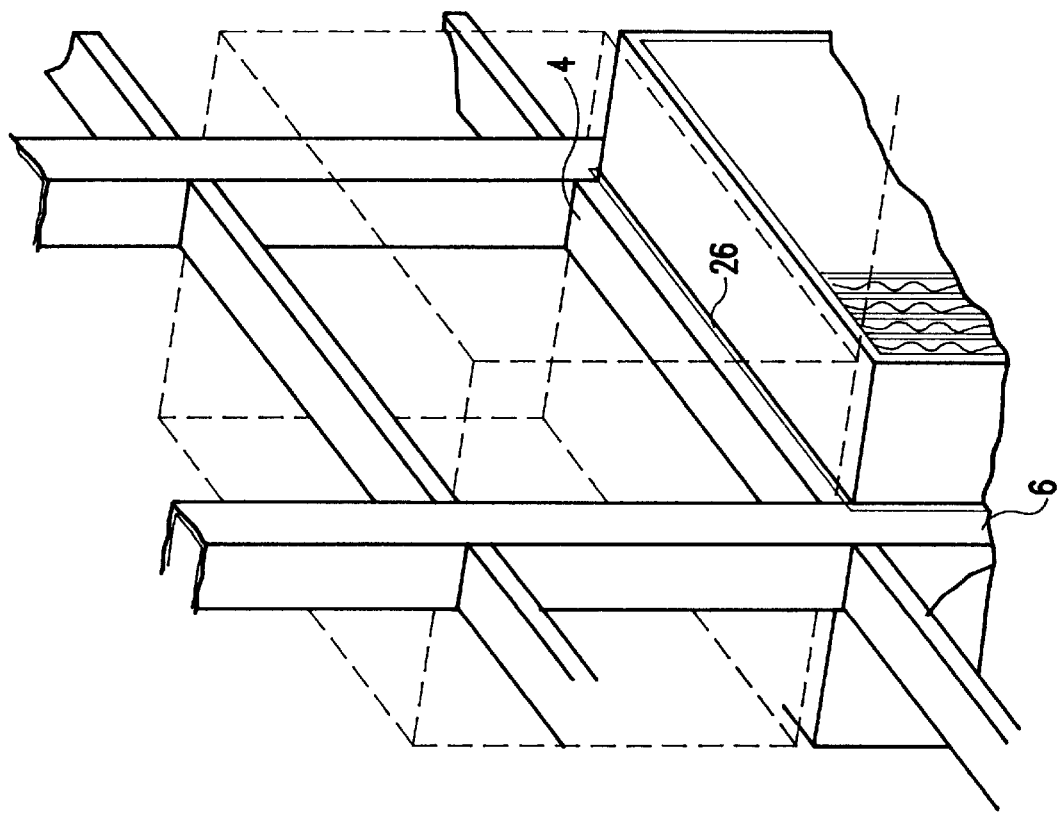
Figure 5A:
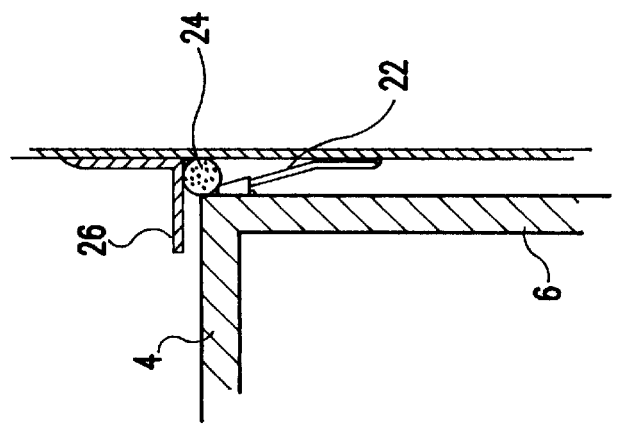

(c) panels (4) are provided with slots (18) and the modules are suspended on the panels by plugging wedge-shaped "ears" (20) into the slots, as shown in FIG. 4.

(d) the modules are plugged into the framework and fastened to the framework by means of pawls (20) being elastically pre-stressed. The module is tightened against the panels by rope packing (24) being pressed against the panel by angle bar (26) mounted on the module wall.

We claim:

1. Method for in situ installation of catalyst modules in an off-gas channel comprising the steps of arranging within the channel perpendicular to the gas flow direction a fitting frame by mounting elongated panels on walls of the channel;

mounting to the frame a number of horizontal and vertical suspension panels with a horizontal and vertical interval corresponding to the horizontal and vertical length of a catalyst module; and suspending in a gas tight manner the catalyst modules on the suspension panels.

* * * * *